US010626656B2

(12) United States Patent
Muramatsu et al.

(10) Patent No.: US 10,626,656 B2
(45) Date of Patent: Apr. 21, 2020

(54) ASSEMBLING DETERMINATION METHOD AND ASSEMBLING DETERMINATION DEVICE FOR VEHICULAR OPENING-CLOSING BODY DRIVING DEVICE

(71) Applicant: Shiroki Corporation, Fujisawa-shi, Kanagawa (JP)

(72) Inventors: Atsushi Muramatsu, Fujisawa (JP); Toru Ikoma, Fujisawa (JP); Yoshiki Sugita, Fujisawa (JP); Kimihiro Kinoshita, Fujisawa (JP)

(73) Assignee: SHIROKI CORPORATION, Fujisawa-Shi, Kanagawa (JP)

( * ) Notice: Subject to any disclaimer, the term of this patent is extended or adjusted under 35 U.S.C. 154(b) by 118 days.

(21) Appl. No.: 16/076,453

(22) PCT Filed: Mar. 21, 2017

(86) PCT No.: PCT/JP2017/011221
§ 371 (c)(1),
(2) Date: Aug. 8, 2018

(87) PCT Pub. No.: WO2017/179370
PCT Pub. Date: Oct. 19, 2017

(65) Prior Publication Data
US 2019/0040668 A1 Feb. 7, 2019

(30) Foreign Application Priority Data

Apr. 12, 2016 (JP) .................................. 2016-079669

(51) Int. Cl.
*G05D 3/00* (2006.01)
*E05F 11/48* (2006.01)
(Continued)

(52) U.S. Cl.
CPC ............ *E05F 11/48* (2013.01); *E05F 11/483* (2013.01); *G01M 17/007* (2013.01);
(Continued)

(58) Field of Classification Search
CPC ....... E05F 11/48; E05F 11/483; E05F 15/689; G01M 17/007; E05Y 2201/664; E05Y 2900/55
See application file for complete search history.

(56) References Cited

U.S. PATENT DOCUMENTS 4,428,540 A * 1/1984 Calcagno ........... B65H 54/2851
242/437.3
4,706,412 A * 11/1987 Kobrehel .............. E05F 11/382
49/352

(Continued)

FOREIGN PATENT DOCUMENTS

JP       57-74390 U     5/1982
JP       1-143792 U    10/1989

(Continued)

OTHER PUBLICATIONS

International Search Report (PCT/ISA/210) dated May 16, 2017, by the Japanese Patent Office as the International Searching Authority for International Application No. PCT/JP2017/011221.

*Primary Examiner* — Khoi H Tran
*Assistant Examiner* — Jorge O Peche
(74) *Attorney, Agent, or Firm* — Buchanan Ingersoll & Rooney PC (57) ABSTRACT

An assembling determination method and an assembling determination device for a vehicular opening-closing body driving device can determine a normal/abnormal winding of a drive wire around a spiral groove to ensure a quick and accurate action. The assembling determination method includes winding a drive wire around the spiral groove on the peripheral surface of a drive drum, wherein the drive
(Continued)

wire drives a vehicular opening-closing body, arranging an inspection jig to face the drive drum surface via a clearance, determining that the drive wire is wound around the spiral groove in an abnormal manner when the inspection jig contacts the drive wire, and determining that the drive wire to be wound around the spiral groove in a normal manner when the inspection jig and the drive wire are contactless.

5 Claims, 5 Drawing Sheets

(51) Int. Cl.
 *G01M 17/007* (2006.01)
 *E05F 15/689* (2015.01)
(52) U.S. Cl.
 CPC ....... *E05F 15/689* (2015.01); *E05Y 2201/664* (2013.01); *E05Y 2900/55* (2013.01)

(56) References Cited

U.S. PATENT DOCUMENTS

| | | | | |
|---|---|---|---|---|
| 4,915,314 A * | 4/1990 | Colli | ...................... | B65H 54/42 242/486.3 |
| 5,582,355 A * | 12/1996 | Nakamura | ........... | B65H 63/086 242/562 |
| 5,762,579 A * | 6/1998 | Torii | ........................ | G01D 5/25 477/11 |
| 5,773,947 A * | 6/1998 | Torii | ........................ | G01D 5/04 160/9 |
| 5,791,204 A * | 8/1998 | Torii | ..................... | B60J 7/0573 296/223 |
| 5,823,905 A * | 10/1998 | Torii | ........................ | G01D 5/25 475/149 |
| 5,875,588 A * | 3/1999 | Torii | ........................ | G01D 5/25 49/349 |
| 5,896,703 A * | 4/1999 | Wright | .................. | E05F 15/627 192/48.2 |
| 6,092,336 A * | 7/2000 | Wright | .................. | E05F 1/1091 192/48.2 |
| 6,107,712 A * | 8/2000 | Yamamura | ............ | E05F 15/697 200/11 DA |
| 6,483,054 B2 * | 11/2002 | Suzuki | ..................... | B60J 10/00 200/61.43 |
| 2001/0017587 A1 * | 8/2001 | Suzuki | ..................... | B60J 10/00 340/545.7 |
| 2002/0020116 A1 * | 2/2002 | Arquevaux | ........... | E05F 11/485 49/349 |
| 2006/0143985 A1 * | 7/2006 | Garcia Martin | ...... | E05F 11/488 49/352 |
| 2007/0151795 A1 * | 7/2007 | Chino | .................... | B62D 5/003 180/444 |
| 2009/0042052 A1 * | 2/2009 | Tsuda | .................... | D07B 1/0673 428/592 |
| 2010/0122496 A1 * | 5/2010 | Lahnala | ................ | E05F 11/535 49/360 |
| 2014/0354297 A1 * | 12/2014 | Choi | .................... | G01R 31/021 324/539 |
| 2015/0191953 A1 * | 7/2015 | Marsh | ..................... | E05F 11/48 49/404 |

FOREIGN PATENT DOCUMENTS

| | | |
|---|---|---|
| JP | 11-241559 A | 9/1999 |
| JP | 2011-12469 A | 1/2011 |

* cited by examiner

ASSEMBLING DETERMINATION METHOD AND ASSEMBLING DETERMINATION DEVICE FOR VEHICULAR OPENING-CLOSING BODY DRIVING DEVICE

TECHNICAL FIELD

The present invention relates to an assembling determination method and an assembling determination device for a vehicular opening-closing body driving device.

BACKGROUND ART

A window regulator (a vehicular opening-closing body driving device) has a basic configuration that includes a guide rail extending in a longitudinal direction, a slider base that is supported to this guide rail so as to be freely movable up and down and a window glass (a vehicular opening-closing body) is supported to the slider base, a drive wire to move this slider base up and down and drive along the guide rail, a drive drum around which this drive wire is wound, a drum housing that rotatably houses and supports this drive drum, and a motor unit that is supported to this drum housing and rotatably drives the drive drum.

Manufacturing this type of window regulator requires a process for winding the drive wire around a spiral groove (a drive-wire winding groove) formed on a peripheral surface of the drive drum. This process may be executed before the drive drum is housed and supported to the drum housing, or may be executed after the drive drum is housed and supported to the drum housing.

When the drive wire is wound around the spiral groove in a normal manner, the drive wire is wound along the spiral groove without protruding from the spiral groove and with a tension applied to an extent sufficient for use state. In contrast, when the drive wire is wound around the spiral groove in an abnormal manner, the drive wire is wound not along the spiral groove but protrudes from the spiral groove (for example, a groove-skip winding), or wound in a loosened state without a tension applied to an extent sufficient for use state. In the case of the abnormal winding, an abnormal noise or an operation failure occurs in operating the window regulator.

Patent Document 1: JP-A-2011-12469

DISCLOSURE OF THE INVENTION

Problems to be Solved by the Invention

A conventional window regulator (a vehicular opening-closing body driving device) does not have a simple method for determining normal/abnormal winding of the drive wire around the spiral groove, and there has been a problem that it is difficult to quickly and accurately act even when the drive wire is wound around the spiral groove in an abnormal manner.

The present invention has been made based on the above-described awareness on the problem, and it is an object of the present invention to provide an assembling determination method and an assembling determination device for a vehicular opening-closing body driving device that can simply determine normal/abnormal winding of a drive wire around a spiral groove to ensure a quick and accurate action.

Solutions to the Problems

An assembling determination method for a vehicular opening-closing body driving device of the present invention includes a step of winding, a step of arranging, and a step of determining. The step of winding is a step of winding a drive wire around a spiral groove. The drive wire drives a vehicular opening-closing body. The spiral groove is formed on a peripheral surface of a drive drum. The step of arranging is a step of arranging an inspection jig so as to face the peripheral surface of the drive drum via a clearance. The step of determining is a step of determining a normal/abnormal winding of the drive wire around the spiral groove corresponding to a contact/non-contact of the inspection jig with the drive wire. The step of determining determines the drive wire to be wound around the spiral groove in an abnormal manner when the inspection jig contacts the drive wire, and determines the drive wire to be wound around the spiral groove in a normal manner when the inspection jig and the drive wire are contactless.

The step of determining can be executed while rotatably driving the drive drum.

The vehicular opening-closing body driving device can include a drum housing. The drum housing rotatably houses and supports the drive drum. The drum housing includes an inspection jig arranging portion for arranging the inspection jig.

The drum housing can include a large-diameter bottomed cylindrical portion and a small-diameter cylindrical portion. The large-diameter bottomed cylindrical portion rotatably houses and supports the drive drum. The small-diameter cylindrical portion is bulged from a part in a circumferential direction of the large-diameter bottomed cylindrical portion to an outer peripheral side. The small-diameter cylindrical portion constitutes the inspection jig arranging portion.

An assembling determination device for a vehicular opening-closing body driving device of the present invention includes a drive drum, an inspection jig, and a determination unit. The drive drum includes a spiral groove on a peripheral surface of the drive drum. A drive wire is wound around the spiral groove. The drive wire drives a vehicular opening-closing body. The inspection jig is arranged so as to face the peripheral surface of the drive drum via a clearance. The determination unit determines a normal/abnormal winding of the drive wire around the spiral groove corresponding to a contact/non-contact of the inspection jig with the drive wire. The determination unit determines the drive wire to be wound around the spiral groove in an abnormal manner when the inspection jig contacts the drive wire, and determines the drive wire to be wound around the spiral groove in a normal manner when the inspection jig and the drive wire are contactless.

In this description, "the drive wire is wound around the spiral groove in a normal manner" means "a state where the drive wire is wound along the spiral groove without protruding from the spiral groove and a tension is applied to an extent sufficient for use state."

In this description, "the drive wire is wound around the spiral groove in an abnormal manner" means "a state where the drive wire is wound not along the spiral groove but protrudes from the spiral groove (for example, a groove-skip winding), or wound in a loosened state without a tension applied to an extent sufficient for use state."

Effects of the Invention

According to the present invention, an assembling determination method and an assembling determination device for a vehicular opening-closing body driving device that can simply determine normal/abnormal winding of a drive wire around a spiral groove to ensure a quick and accurate action can be provided.

DESCRIPTION OF PREFERRED EMBODIMENTS

With reference to FIG. 1 to FIG. 7, a window regulator (a vehicular opening-closing body driving device) 10 according to the embodiment will be described.

Figure 1:
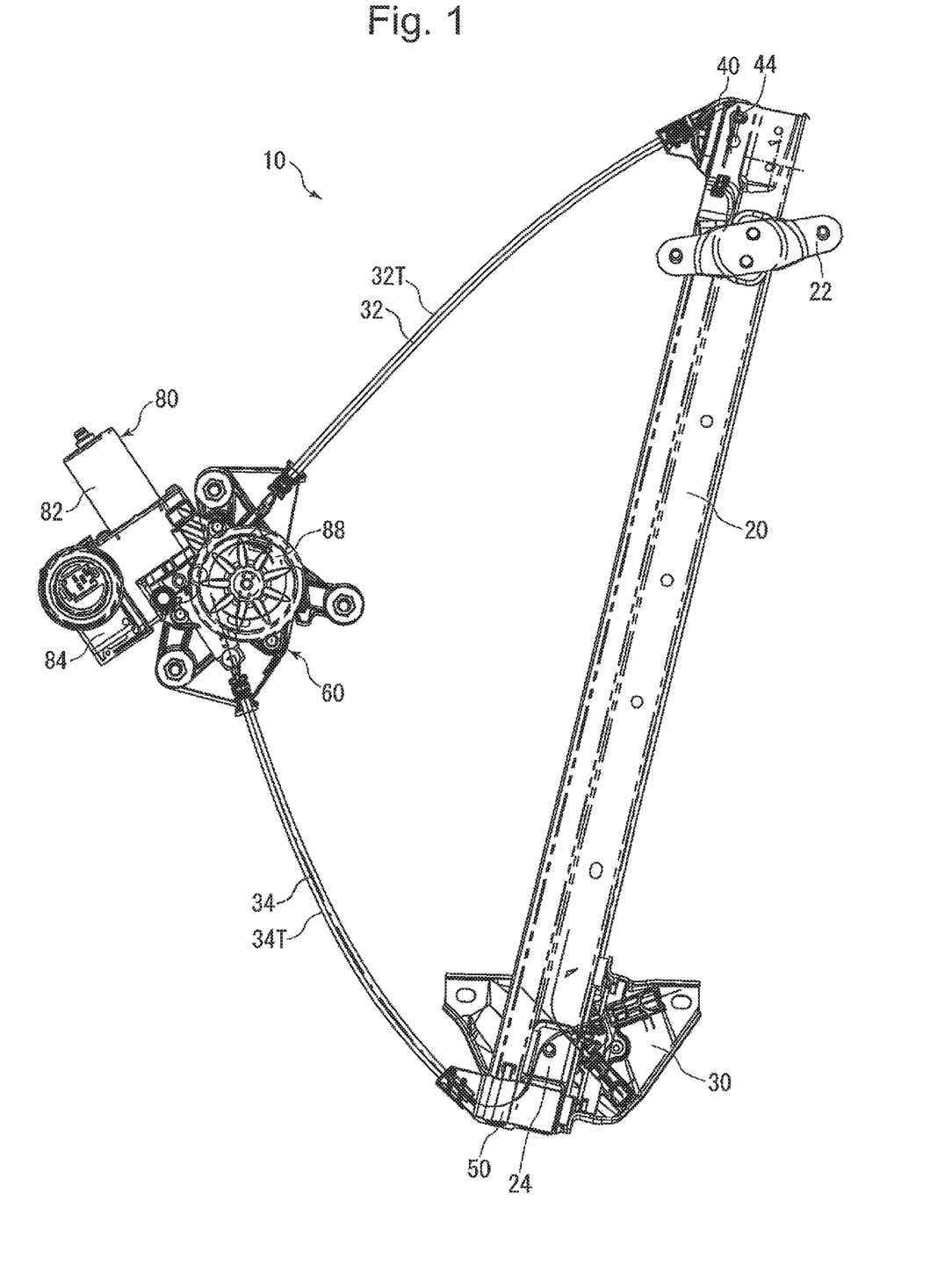
FIG. 1 is a front view of a window regulator (a vehicular opening-closing body driving device) according to this embodiment.
Figure 2:
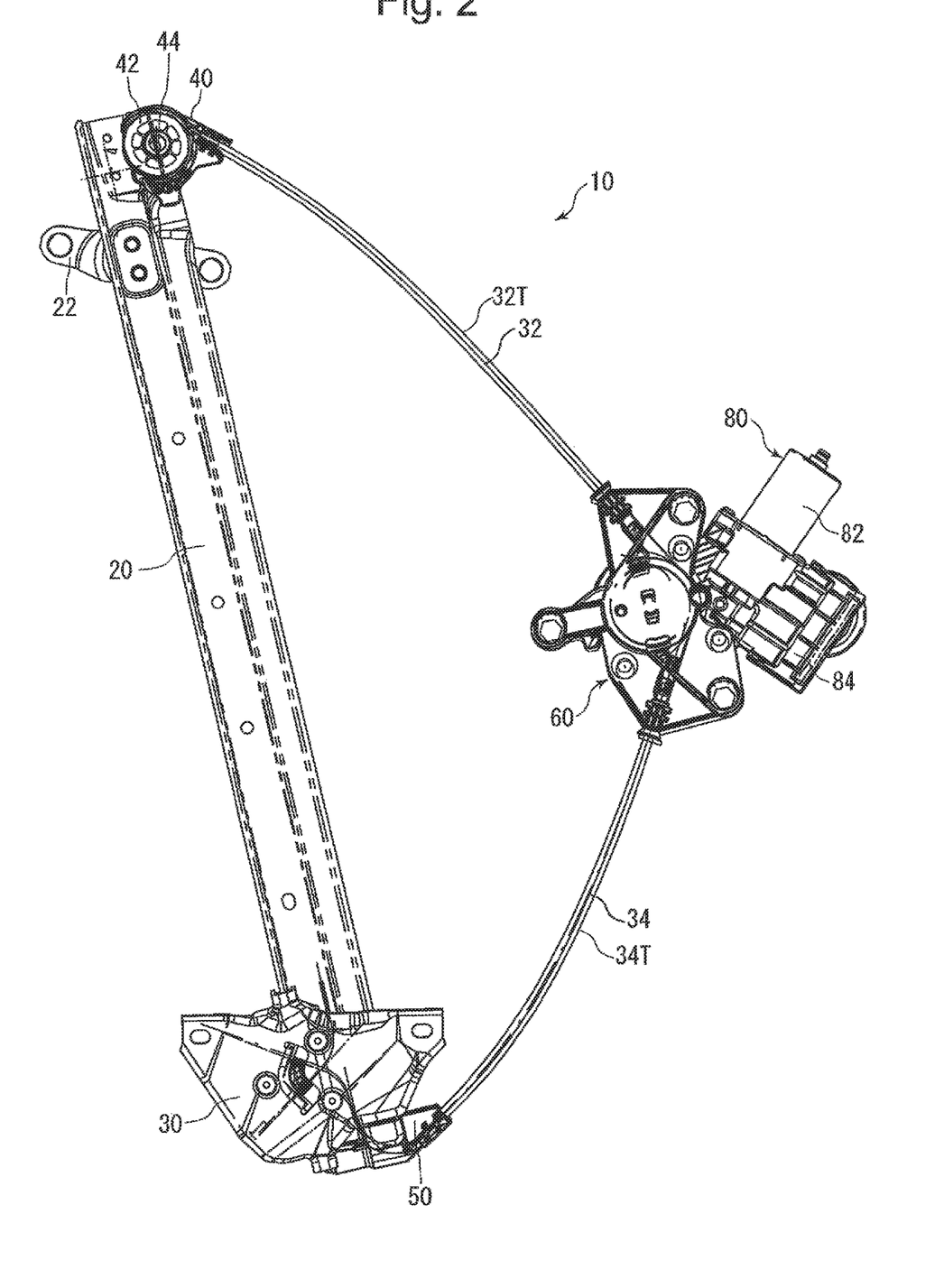
FIG. 2 is a back view of the window regulator (the vehicular opening-closing body driving device) according to the embodiment.

The window regulator 10 includes a guide rail 20 as an elongated member. This guide rail 20 is mounted to an inside of a door panel (not illustrated) of a vehicle via brackets 22 and 24 disposed on different positions in a longitudinal direction. The guide rail 20 is arranged having the longitudinal direction in an almost height direction of the vehicle in a state of being mounted to the door panel of the vehicle.

The window regulator 10 includes a slider base (a glass carrier) 30 that is supported to the guide rail 20 so as to be freely movable up and down, and a window glass (a not illustrated vehicular opening-closing body) is supported to the slider base 30. Respective one ends of a pair of drive wires 32 and 34 are coupled to this slider base 30. The pair of drive wires 32 and 34 are made of conductive materials such as stainless steel, tungsten, titanium, and phosphor bronze.

A pulley bracket 40 is secured adjacent to an upper end in the longitudinal direction of the guide rail 20, and a guide pulley 42 is rotatably supported to this pulley bracket 40 via a pulley support shaft 44. The drive wire 32 extends from the slider base 30 in an upward direction of the guide rail 20 along the guide rail 20, and is supported by a wire guide groove formed on an outer peripheral surface of the guide pulley 42. Corresponding to advance and retreat of the drive wire 32, the guide pulley 42 rotates around the pulley support shaft 44.

A wire guide member 50 is disposed adjacent to a lower end in the longitudinal direction of the guide rail 20. The drive wire 34 extends from the slider base 30 in a downward direction of the guide rail 20 along the guide rail 20, and is guided by the wire guide member 50. The wire guide member 50 is secured to the guide rail 20, and the drive wire 34 is supported such that the drive wire 34 is configured to advance and retreat along a wire guide groove formed on the wire guide member 50.

The drive wire 32 coming out from the guide pulley 42 is inserted through a tubular outer tube 32T and wound around a drive drum 70 disposed inside a drum housing 60 to which the outer tube 32T is coupled. The drive wire 34 coming out from the wire guide member 50 is inserted through a tubular outer tube 34T and wound around the drive drum 70 disposed inside the drum housing 60 to which the outer tube 34T is coupled.

Figure 3:
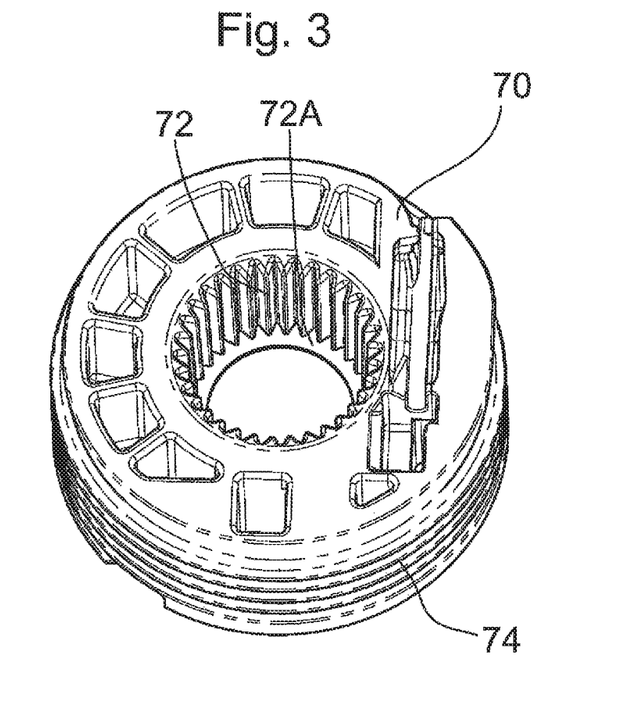
FIG. 3 is a perspective view of a drive drum.
Figure 4:
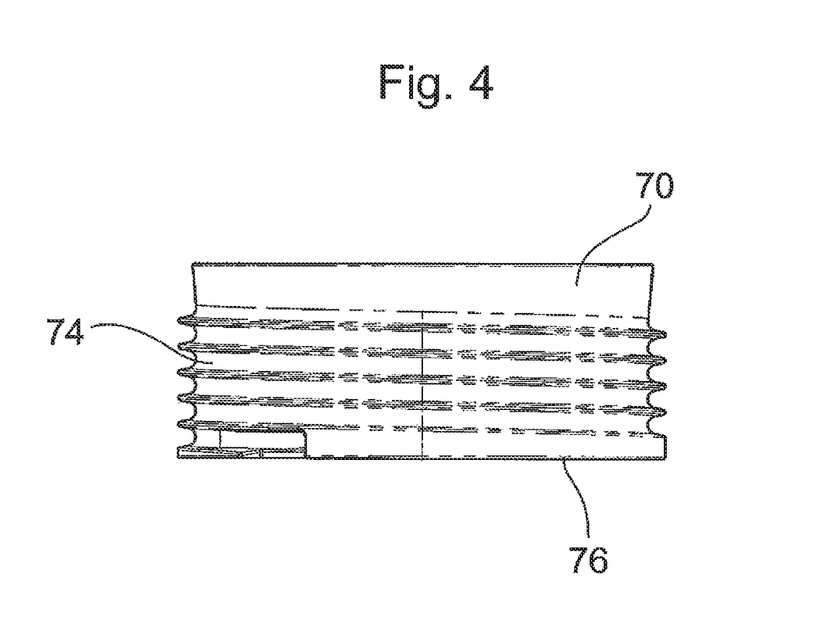
FIG. 4 is a side view of the drive drum viewing in a direction perpendicular to a rotation axis.

As illustrated in FIG. 3 and FIG. 4, the drive drum 70 has a columnar shape, and includes a shaft fitting hole 72 passing through in an axial direction in the center portion. This shaft fitting hole 72 has an inner surface on which sawtooth-shaped serrations are formed. The drive drum 70 has an outer peripheral surface (a peripheral surface) on which a spiral groove (a drive-wire winding groove) 74 is formed, and the drive wire 32 and the drive wire 34 are wound around the spiral groove 74. This spiral groove 74 varies the position in the axial direction of the drive drum 70 while circling along the outer peripheral surface of the drive drum 70. A portion excluding the shaft fitting hole 72 on a surface of the drive drum 70 facing the drum housing 60 side constitutes a circular planar sliding portion (a sliding portion) 76.

Figure 6:
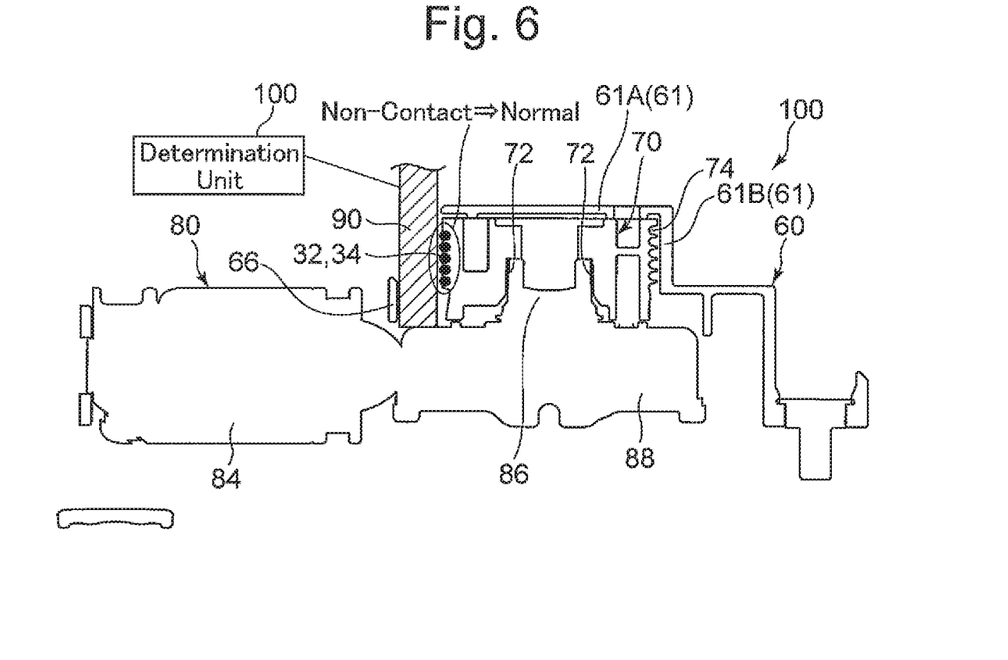
FIG. 6 is a drawing illustrating a state of an assembling determination by an inspection jig and a determination unit in a case where a drive wire is wound around a spiral groove in a normal manner.
Figure 7:
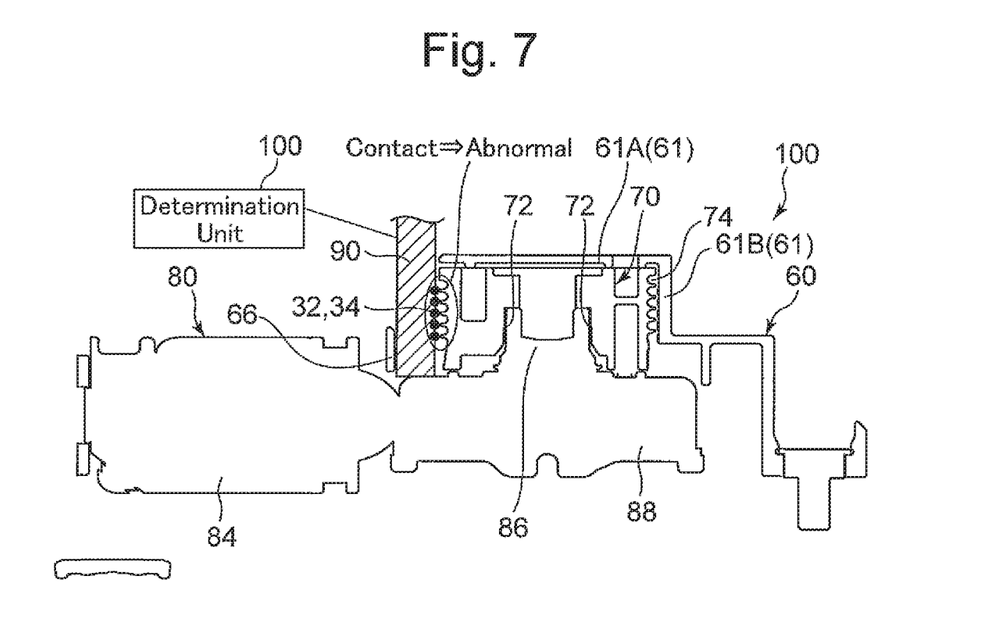
FIG. 7 is a drawing illustrating a state of an assembling determination by the inspection jig and the determination unit in a case where the drive wire is wound around the spiral groove in an abnormal manner.

A motor unit (a rotary driving unit) 80 is mounted to the drum housing 60. The motor unit 80 includes a motor 82, a gear box 84 having a built-in reduction gear train that transmits rotation of an output shaft of this motor 82 while decreasing the rotation, and a fitting shaft 86 (FIG. 6, FIG. 7) to which a rotary driving force of the motor 82 is transmitted via the reduction gear train of this gear box 84. The motor unit 80 includes a cover 88 that covers an opening portion (a housing opening 61C of a drum housing portion 61 described later) of the drum housing 60, and the fitting shaft 86 projects from the cover 88 and fits to the shaft fitting hole 72 of the drive drum 70. The fitting shaft 86 has serrations fitting to the serrations of the shaft fitting hole 72, and driving the motor 82 in this fitting state rotates the drive drum 70 together with the fitting shaft 86 (FIG. 6, FIG. 7).

The outer tube 32T has one end coupled to the pulley bracket 40 and the other end coupled to the drum housing 60, and the drive wire 32 is configured to advance and retreat in the outer tube 32T having thus determined both end positions. The outer tube 34T has one end coupled to the wire guide member 50 and the other end coupled to the drum housing 60, and the drive wire 34 is configured to advance and retreat in the outer tube 34T having thus determined both end positions.

The drum housing 60 is secured to the door panel (not illustrated) of the vehicle. When the driving force of the motor 82 positively/reversely rotates the drive drum 70, one of the drive wire 32 and the drive wire 34 increases a winding amount around the spiral groove 74 of the drive drum 70, and the other is drawn out from the spiral groove 74 of the drive drum 70, thus causing the slider base 30 to move along the guide rail 20 due to a relationship of pulling and loosening between the drive wire 32 and the drive wire 34. Corresponding to the move of the slider base 30, the window glass (the not illustrated vehicular opening-closing body) moves up and down.

Figure 5:
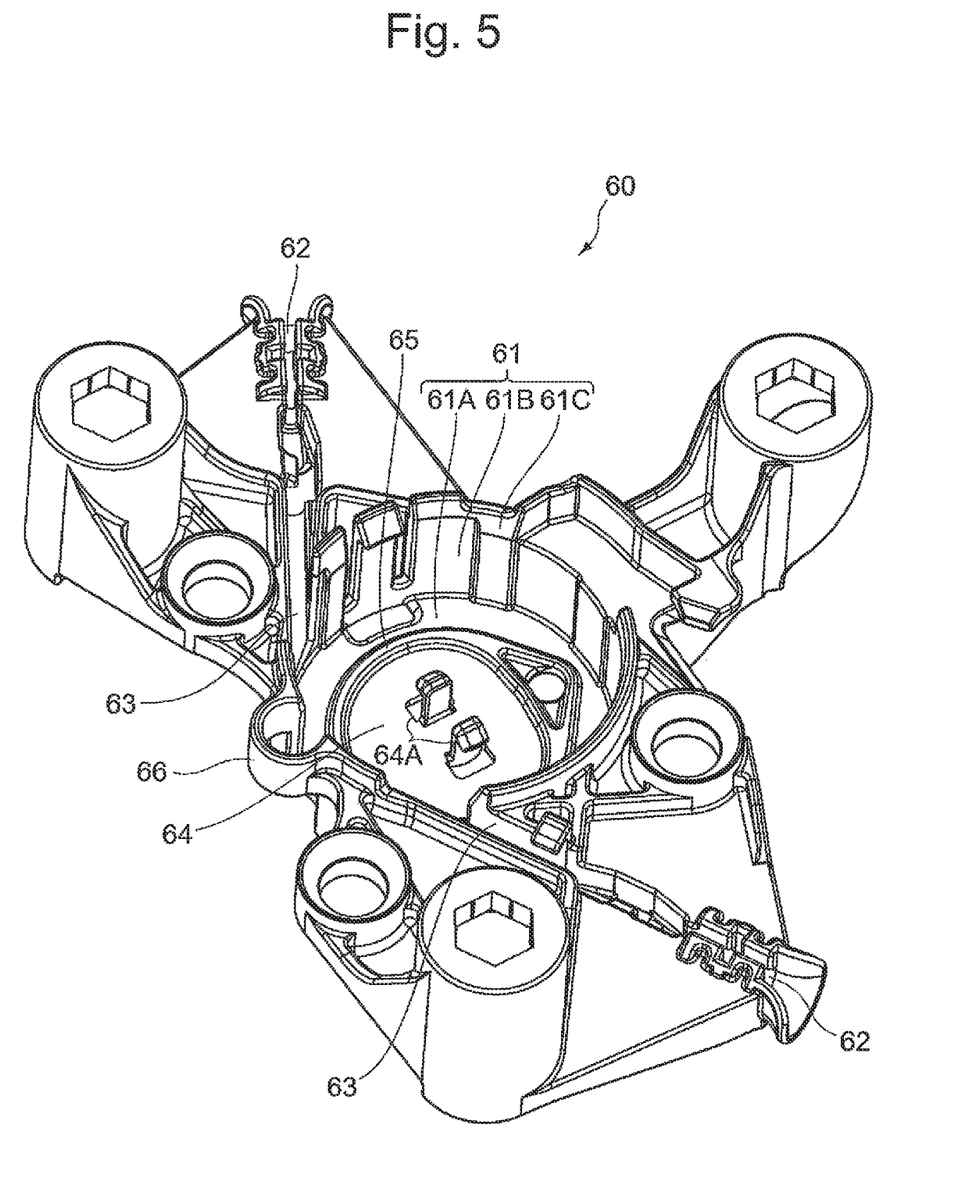
FIG. 5 is a perspective view illustrating a configuration of a drum housing.

As illustrated in FIG. 5, the drum housing 60 includes a drum housing portion (a large-diameter bottomed cylindrical portion) 61 and a pair of outer tube insertion portions 62. The drum housing portion 61 has a space surrounded by a bottom portion 61A and a cylindrically-shaped rising wall 61B formed on a peripheral edge of the bottom portion 61A, and has a side opening as the housing opening 61C on an opposite side of the bottom portion 61A. The drum housing 60 includes a pair of wire passage grooves 63, which are communicated with the drum housing portion 61, in mutually different directions (directions of the pulley bracket 40 and the wire guide member 50 in a completed state of the window regulator 10), and the pair of outer tube insertion portions 62 are formed on distal ends of the pair of wire passage grooves 63.

The bottom portion 61A of the drum housing 60 includes a drum support base 64 formed in an approximately circular shape in plan view. The drive drum 70 is inserted into the drum housing portion 61 in a state where the planar sliding portion (the sliding portion) 76 is placed on the drum support base 64. The drum support base 64 includes a shaft protrusion 64A in a bifurcated shape in the center, and the drive drum 70 includes a smooth cylindrical surface 72A on a part of the shaft fitting hole 72 (FIG. 3). Inserting the shaft protrusion 64A into the cylindrical surface 72A to bring both into sliding contact rotatably houses and supports the drive drum 70 to the drum housing 60. Transmission of the driving force of the motor 82 causes the drive drum 70 to rotate around its own rotation axis.

The bottom portion 61A of the drum housing 60 includes a slide bead (a sliding portion, a protrusion) 65 in an approximately circular shape in plan view so as to surround the shaft protrusion 64A of the drum support base 64. This slide bead 65 projects toward the planar sliding portion (the sliding portion) 76 of the drive drum 70 in a state where the drive drum 70 is housed and supported to the drum housing 60. Rotating the drive drum 70 with respect to the drum housing 60 causes the planar sliding portion (the sliding portion) 76 and the slide bead (the sliding portion, the protrusion) 65 as the sliding portions of the drive drum 70 and the drum housing 60 to slide (slidingly contact). A grease (a lubricant) is applied over those sliding portions (slidingly-contact portions) to ensure smooth performances of the drive drum 70 and the drum housing 60.

The drum housing 60 includes an inspection jig holder (a small-diameter cylindrical portion, an inspection jig arranging portion) 66 bulged from a part in a circumferential direction of the drum housing portion (the large-diameter bottomed cylindrical portion) 61 to an outer peripheral side. More specifically, the rising wall 61B of the drum housing portion 61 has a part in the circumferential direction formed as a cutout portion, and the inspection jig holder 66 in a partial cylindrical shape is formed so as to project out from this cutout portion to the outer peripheral side. The inspection jig holder (the small-diameter cylindrical portion, the inspection jig arranging portion) 66 is formed only on a part (in this embodiment, near the upper end portion) in a height direction of the drum housing portion (the large-diameter bottomed cylindrical portion) 61.

As illustrated in FIG. 6 and FIG. 7, an inspection jig 90 is arranged on the inspection jig holder 66 so as to face the outer peripheral surface (the peripheral surface) of the drive drum 70 via a clearance. This inspection jig 90 is constituted of a conductive rod-shaped member extending in a direction parallel to a rotation axis line of the drive drum 70, and is held in a state of being positioned by a partial inner cylindrical surface of the inspection jig holder 66.

As illustrated in FIG. 6, in the case where the inspection jig 90 is arranged (held) on the inspection jig holder 66 in the positioned state, when the pair of drive wires 32 and 34 are wound around the spiral groove 74 in a normal manner, that is, the pair of drive wires 32 and 34 are wound along the spiral groove 74 without protruding from the spiral groove 74 and with a tension applied to an extent sufficient for use state, the inspection jig 90 does not contact the pair of drive wires 32 and 34.

As illustrated in FIG. 7, in the case where the inspection jig 90 is arranged (held) on the inspection jig holder 66 in the positioned state, when the pair of drive wires 32 and 34 are wound around the spiral groove 74 in an abnormal manner, that is, the pair of drive wires 32 and 34 are wound not along the spiral groove 74 but protrudes from the spiral groove 74 (for example, a groove-skip winding), or wound in a loosened state without a tension applied to an extent sufficient for use state, the inspection jig 90 contacts the pair of drive wires 32 and 34.

To the inspection jig 90, a determination unit 100 including a current detecting device is coupled. This determination unit 100 determines the normal/abnormal winding of the pair of drive wires 32 and 34 around the spiral groove 74 corresponding to contact/non-contact of the inspection jig 90 with the pair of drive wires 32 and 34.

More specifically, current is preliminarily passed through the inspection jig 90, and when the current in the case where the inspection jig 90 contacts the pair of drive wires 32 and 34 is detected, the determination unit 100 determines that the pair of drive wires 32 and 34 are wound around the spiral groove 74 in an abnormal manner. On the other hand, when the inspection jig 90 and the pair of drive wires 32 and 34 are contactless and the current is not detected, the determination unit 100 determines that the pair of drive wires 32 and 34 are wound around the spiral groove 74 in a normal manner.

The determination process by the determination unit 100 is executed while rotatably driving the drive drum 70 by the motor unit (the rotary driving unit) 80 in the state where the inspection jig 90 is arranged (held) on the inspection jig holder 66 in the positioned state. A rotation drive amount of the drive drum 70 is configured to be at least equal to or more than one rotation.

The determination process by the determination unit 100 (an assembling determination process of the window regulator 10) can be executed in various situations. For example, before manufacturing the window regulator 10, the determination process (the assembling determination process of the window regulator 10) by the determination unit 100 is applicable to a case where the drive wires 32 and 34 are temporarily wound around the drive drum 70, and subsequently, the drive drum 70 is housed and supported to the drum housing 60 and the tension is applied, and/or a case where the drive drum 70 is housed and supported to the drum housing 60, and subsequently, the drive wires 32 and 34 are wound (the tension is applied) around the drive drum 70. The determination process (the assembling determination process of the window regulator 10) by the determination unit 100 is applicable as a delivery check when the window regulator 10 is delivered after the manufacture of the window regulator 10, and/or as the last check before assembling the window regulator 10 to a door panel of a vehicle. Furthermore, the determination process (the assembling determination process of the window regulator 10) by the determination unit 100 is applicable after assembling the window regulator 10 to the door panel of the vehicle as a failure detection and the like.

As described above, according to this embodiment, the inspection jig 90 is arranged so as to face the outer peripheral surface (the peripheral surface) of the drive drum 70 via the clearance, thus determining the normal/abnormal winding of the pair of drive wires 32 and 34 around the spiral groove 74 corresponding to the contact/non-contact of the inspection jig 90 with the pair of drive wires 32 and 34. More specifically, when the inspection jig 90 contacts the pair of drive wires 32 and 34, the pair of drive wires 32 and 34 are determined to be wound around the spiral groove 74 in an abnormal manner, and when the inspection jig 90 and the pair of drive wires 32 and 34 are contactless, the pair of drive wires 32 and 34 are determined to be wound around the spiral groove 74 in a normal manner. Accordingly, the normal/abnormal winding of the pair of drive wires 32 and 34 around the spiral groove 74 can be simply determined to ensure the quick and accurate action.

While, in the above-described embodiment, the description has been given of the exemplary case where the assembling determination method and the assembling determination device for the vehicular opening-closing body driving device of the present invention is applied to the assembling determination method and the assembling determination device for the window regulator 10, the assembling determination method and the assembling determination device for the vehicular opening-closing body driving device of the present invention is similarly applicable to an assembling determination method and an assembling determination device for a vehicular opening-closing body driving device other than the window regulator 10.

INDUSTRIAL APPLICABILITY

The assembling determination method and the assembling determination device for the vehicular opening-closing body driving device of the present invention is preferably applied to, for example, an assembling determination for a window regulator configured to move a window glass of a vehicle up and down.

DESCRIPTION OF REFERENCE SIGNS 10 window regulator (vehicular opening-closing body driving device)
20 guide rail
22 bracket
24 bracket
30 slider base (glass carrier)
32 drive wire
32T outer tube
34 drive wire
34T outer tube
40 pulley bracket
42 guide pulley
44 pulley support shaft
50 wire guide member
60 drum housing
61 drum housing portion (large-diameter bottomed cylindrical portion)
61A bottom portion
61B rising wall
61C housing opening
62 outer tube insertion portion
63 wire passage groove
64 drum support base
64A shaft protrusion
65 slide bead (sliding portion, protrusion)
66 inspection jig holder (small-diameter cylindrical portion, inspection jig arranging portion)
70 drive drum
72 shaft fitting hole
72A cylindrical surface
74 spiral groove (drive-wire winding groove)
76 planar sliding portion (sliding portion)
80 motor unit (rotary driving unit)
82 motor
84 gear box
86 fitting shaft
88 cover
90 inspection jig (conductive rod-shaped member)
100 determination unit (current detecting device)

The invention claimed is:

1. An assembling determination method for a vehicular opening-closing body driving device, comprising:
a step of winding a drive wire around a spiral groove, the drive wire driving a vehicular opening-closing body, the spiral groove being formed on a peripheral surface of a drive drum;
a step of arranging an inspection jig so as to face the peripheral surface of the drive drum via a clearance; and
a step of determining normal or abnormal winding of the drive wire around the spiral groove corresponding to a contact or a non-contact of the inspection jig with the drive wire, wherein
the step of determining determines the drive wire to be wound around the spiral groove in an abnormal manner when the inspection jig contacts the drive wire, and determines the drive wire to be wound around the spiral groove in a normal manner when the inspection jig and the drive wire are contactless.

2. The assembling determination method for the vehicular opening-closing body driving device according to claim 1, wherein
the step of determining is executed while rotatably driving the drive drum.

3. The assembling determination method for the vehicular opening-closing body driving device according to claim 1, wherein
the vehicular opening-closing body driving device includes a drum housing that rotatably houses and supports the drive drum, and the drum housing includes an inspection jig arranging portion for arranging the inspection jig.

4. The assembling determination method for the vehicular opening-closing body driving device according to claim 3, wherein
the drum housing includes a large-diameter bottomed cylindrical portion and a small-diameter cylindrical portion, the large-diameter bottomed cylindrical portion rotatably houses and supports the drive drum, the small-diameter cylindrical portion is bulged from a part in a circumferential direction of the large-diameter bottomed cylindrical portion to an outer peripheral side, and the small-diameter cylindrical portion constitutes the inspection jig arranging portion.

5. An assembling determination device for a vehicular opening-closing body driving device, comprising:
a drive drum that includes a spiral groove on a peripheral surface of the drive drum, a drive wire being wound around the spiral groove, the drive wire driving a vehicular opening-closing body;
an inspection jig arranged so as to face the peripheral surface of the drive drum via a clearance; and
a determination unit that determines normal or abnormal winding of the drive wire around the spiral groove corresponding to a contact or a non-contact of the inspection jig with the drive wire, wherein
the determination unit determines the drive wire to be wound around the spiral groove in an abnormal manner when the inspection jig contacts the drive wire, and determines the drive wire to be wound around the spiral groove in a normal manner when the inspection jig and the drive wire are contactless.

* * * * *